US008192667B2

(12) United States Patent
Shoji et al.

(10) Patent No.: US 8,192,667 B2
(45) **Date of Patent: *Jun. 5, 2012**

(54) APPARATUS FOR MANUFACTURING A HONEYCOMB STRUCTURE

(75) Inventors: Ryuichi Shoji, Tokyo (JP); Takuya Nunome, Nagoya (JP); Koji Kimura, Nagoya (JP); Yoshimasa Kondo, Nagoya (JP); Hiroyuki Tsuji, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/005,617

(22) Filed: Jan. 13, 2011

(65) Prior Publication Data

US 2011/0108201 A1 May 12, 2011

Related U.S. Application Data

(62) Division of application No. 12/174,703, filed on Jul. 17, 2008, now Pat. No. 7,919,033.

(30) Foreign Application Priority Data

Jul. 18, 2007 (JP) ................................ 2007-186768

(51) Int. Cl.
*B32B 38/04* (2006.01)
*B32B 38/18* (2006.01)

(52) U.S. Cl. ..................... 264/269; 425/113; 156/89.11; 264/631; 264/259

(58) Field of Classification Search .................. 264/269, 264/259, 154, 630, 631; 425/110, 113; 156/89.11
See application file for complete search history.

(56) References Cited

U.S. PATENT DOCUMENTS

| | | | |
|---|---|---|---|
| 4,557,773 | A | 12/1985 | Bonzo |
| 4,573,896 | A | 3/1986 | Bonzo |
| 4,715,801 | A | 12/1987 | Montierth |
| 5,049,326 | A | 9/1991 | Matsumoto et al. |
| 5,906,839 | A | 5/1999 | Miura et al. |
| 7,550,025 | B2 | 6/2009 | Fukuda et al. |
| 7,638,086 | B2 | 12/2009 | Ito et al. |
| 7,722,791 | B2 | 5/2010 | Kimura et al. |
| 7,803,303 | B2 | 9/2010 | Hagg |
| 7,807,085 | B2 | 10/2010 | Tsuji et al. |

(Continued)

FOREIGN PATENT DOCUMENTS

JP 58-037480 A1 3/1983

(Continued)

*Primary Examiner* — Joseph Del Sole
*Assistant Examiner* — Nahida Sultana
(74) *Attorney, Agent, or Firm* — Burr & Brown

(57) ABSTRACT

A method of manufacturing a honeycomb structure having a plugged portion, which is faster and cheaper to manufacture, and a manufacturing apparatus thereof. A film is attached to an end face of a honeycomb structure in a state where the honeycomb structure is positioned in a table portion having a through hole into which the end face portion of the honeycomb structure is to be inserted, and the film is held in a flat state where a remaining portion of the film which is not attached to the end face is attached to the table portion. Then, holes opened so as to correspond to the openings of a part of cells are formed in the film to form the film as a mask, and a plugging material having fluidity is supplied onto the mask or onto the same plane as the mask to fill the cells with the plugging material.

12 Claims, 13 Drawing Sheets

U.S. PATENT DOCUMENTS

| | | | | |
|---|---|---|---|---|
| 2002/0020944 | A1 | 2/2002 | Yamaguchi et al. | |
| 2005/0076991 | A1 | 4/2005 | Fujita | |
| 2006/0150598 | A1 | 7/2006 | Ichikawa et al. | |
| 2007/0035727 | A1 * | 2/2007 | Chen et al. ................. | 356/237.2 |
| 2007/0114700 | A1 | 5/2007 | Andrewlavage et al. | |
| 2007/0144561 | A1 * | 6/2007 | Saijo et al. ....................... | 134/40 |
| 2007/0182072 | A1 | 8/2007 | Ichikawa et al. | |
| 2007/0221312 | A1 | 9/2007 | Ichikawa | |
| 2008/0006972 | A1 | 1/2008 | Ichikawa | |
| 2008/0079194 | A1 | 4/2008 | Kumagae et al. | |
| 2008/0116601 | A1 | 5/2008 | Naruse et al. | |
| 2009/0243139 | A1 | 10/2009 | Tsuji et al. | |
| 2010/0244307 | A1 | 9/2010 | Lemaire et al. | |

FOREIGN PATENT DOCUMENTS

| | | | |
|---|---|---|---|
| JP | 01-297114 | A1 | 11/1989 |
| JP | 08-189338 | A1 | 7/1996 |
| JP | 2001-300922 | A1 | 10/2001 |
| JP | 2001-334114 | A1 | 12/2001 |
| JP | 2002-028915 | A1 | 1/2002 |
| JP | 2003-320517 | A1 | 11/2003 |
| JP | 2007-283286 | A1 | 11/2007 |
| WO | 2004/085029 | A1 | 10/2004 |
| WO | 2006/068767 | A2 | 6/2006 |

* cited by examiner

APPARATUS FOR MANUFACTURING A HONEYCOMB STRUCTURE

CROSS REFERENCE TO RELATED APPLICATIONS

This application is a division of U.S. patent application Ser. No. 12/174,703, having a filing date of Jul. 17, 2008, and claims the benefit under 35 USC §119(a)-(d) from Japanese Patent Application No. 2007-186768 having a filing date of Jul. 18, 2007, the entireties of which are incorporation herein by reference.

FIELD OF THE INVENTION

The present invention relates to a method of manufacturing a honeycomb structure having a plugged portion, in which plugging portions are formed in opening end portions of cells of the honeycomb structure, and it also relates to a manufacturing apparatus of the structure.

BACKGROUND OF THE INVENTION

A requirement for removing particulate matter and toxic substances contained in exhaust gas discharged from internal combustion engines, a boiler and the like has grown in light of influence on environment. In particular, regulations on removal of particulate matter (hereinafter sometimes referred to as a particulate matter (PM)) discharged from diesel engines tend to be strengthen in Europe and the United States as well as Japan, and a honeycomb structure is used in a trapping filter for removing the PM.

Examples of a filter used for such a purpose include a honeycomb filter utilizing a plugged honeycomb structure including a honeycomb structure in which a plurality of cells constituting fluid channels are partitioned by porous partition walls and formed in a honeycomb-like shape by the partition walls, and plugging portions which alternately plug one opening end and the other opening end of each of the plurality of cells. According to such a honeycomb filter, an exhaust gas G1 is allowed to flow into cells from the exhaust gas inflow side end face of the filter, whereby particulates contained in the exhaust gas are trapped by the partition walls in a case where the exhaust gas G1 passes through the partition walls. In consequence, a purified gas G2 from which the particulates have been removed can be discharged from the purified gas outflow side end face of the filter.

Moreover, as a method of manufacturing the above-mentioned plugged honeycomb structure, for example, a method is suggested which includes the steps of attaching an adhesive sheet or the like to one end face of a honeycomb structure (a non-fired dried ceramic body); making holes only corresponding to cells to be plugged (plugged cells) in the adhesive sheet or the like by laser processing or the like using image processing, to form a mask; immersing, into a slurry (a ceramic slurry), the end face of the honeycomb structure to which the mask is attached to fill the honeycomb structure cells to be plugged with the slurry, thereby forming plugging portions; subjecting the other end face of the honeycomb structure to steps similar to the above steps; and drying and firing the honeycomb structure to obtain the plugged honeycomb structure (e.g., see Patent Document 1).

[Patent Document 1] Japanese Patent Application Laid-Open No. 2001-300922

However, according to the method of making the holes in the adhesive sheet and immersing, into the slurry, the honeycomb structure provided with this adhesive sheet as the mask as described above, operation time is required for leveling the slurry into which the structure is to be immersed, and this is a factor for cost increase. Moreover, the leveling is a very delicate step, and an outer peripheral portion becomes thick or thin owing to slight displacement, so that it is difficult to obtain a uniform plugging depth. A leveling accuracy matches a depth accuracy, so that considerable amounts of labor and time are required for the leveling step. Moreover, a film attached to the structure needs to be bent so that the immersed end of the structure is not made dirty, but it is not easy to appropriately bend the film.

SUMMARY OF THE INVENTION

An object of the present invention is to provide a method of manufacturing a honeycomb structure having a plugged portion, which is capable of shortening manufacturing time to decrease manufacturing cost, and a manufacturing apparatus of the honeycomb structure having a plugged portion.

In a state where a honeycomb structure is positioned with respect to a table portion, a film is attached to the end face of the honeycomb structure so that the side surface portion of the honeycomb structure is not covered. Moreover, the film is held so as to be flat in a state where a remaining portion of the film which is not attached to the end face is attached to the table portion, and holes are formed in the film to form the film as a mask. Afterward, cells to which this mask is attached are filled with a plugging material. In consequence, it has been found that the above object can be achieved in this case. That is, according to the present invention, a method of manufacturing a honeycomb structure having a plugged portion, and a manufacturing apparatus of the honeycomb structure having a plugged portion are provided as follows.

According to one aspect of the present invention, a method is provided for manufacturing a honeycomb structure having a plugged portion, in which cells of a honeycomb structure are plugged, the honeycomb structure having porous partition walls and provided with a plurality of cells partitioned by the partition walls and formed so as to extend through the honeycomb structure from one end face of the honeycomb structure to the other end face thereof, the method comprising: attaching a film to the end face of the honeycomb structure so that the side surface portion of the honeycomb structure is not covered in a state where the honeycomb structure is positioned in a table portion having a through hole into which the end face portion of the honeycomb structure is to be inserted, and holding the film so as to be flat in a state where the remaining portion of the film which is not attached to the end face is attached to the table portion; forming, in the film, the holes opened so as to correspond to the openings of a part of the cells to form the film as a mask; and supplying a plugging material having fluidity onto the mask or onto the same plane as the mask, and filling the cells of the honeycomb structure with the plugging material.

According to a second aspect of the present invention, the method of manufacturing the honeycomb structure having a plugged portion according to the first aspect is provided, wherein after attaching the film to the end face of the honeycomb structure, the end face portion of the honeycomb structure is inserted into the through hole of the table portion.

According to a third aspect of the present invention, the method of manufacturing the honeycomb structure having a plugged portion according to the first aspect is provided, wherein after attaching the film to a region of the surface of the table portion including the through hole, the end face portion of the honeycomb structure is inserted into the through hole to attach the film to the end face of the honeycomb structure.

According to the fourth aspect of the present invention, the method of manufacturing the honeycomb structure having a plugged portion according to the first aspect is provided, wherein after positioning the honeycomb structure and the table portion, the film is attached to the honeycomb structure and the table portion.

According to the fifth aspect of the present invention, the method of manufacturing the honeycomb structure having a plugged portion according to any one of the first to fourth aspects is provided, wherein after attaching the film to the end face of the honeycomb structure, the holes are formed in the film by laser.

According to the sixth aspect of the present invention, an apparatus for manufacturing a honeycomb structure having a plugged portion is provided, the apparatus comprising: film attaching means for attaching a film to the end face of the honeycomb structure in a state where the side surface portion of the honeycomb structure is not covered, the honeycomb structure having porous partition walls and provided with a plurality of cells partitioned by the partition walls and formed so as to extend through the honeycomb structure from one end face of the honeycomb structure to the other end face thereof; a table portion having a through hole into which the honeycomb structure is to be inserted; positioning means for moving the table portion or the honeycomb structure in a state where the honeycomb structure to which the film is attached is inserted into the through hole, and positioning and holding the table portion and the honeycomb structure to attach the remaining portion of the film to the table portion so that the film attached to the end face has a flat state; hole making means for forming, in the film, holes opened so as to correspond to the openings of a part of the cells; plugging material supply means for supplying a plugging material having fluidity onto the mask provided with the holes or onto the table portion; and filling means for filling the cells with the plugging material supplied onto the mask or the table portion.

According to the seventh aspect of the present invention, apparatus for manufacturing a honeycomb structure having a plugged portion is provided, the apparatus comprising: a table portion having a through hole into which the end face portion of a honeycomb structure is to be inserted, the honeycomb structure having porous partition walls and provided with a plurality of cells partitioned by the partition walls and formed so as to extend through the honeycomb structure from one end of the honeycomb structure to the other end face thereof; film attaching means for attaching a film to the side of the surface of the table portion; positioning means for positioning and holding the table portion and the honeycomb structure so as to attach the film to the end face of the honeycomb structure in a state where the end face portion of the honeycomb structure is inserted into the through hole of the table portion provided with the film attached to the side of the surface of the table portion including a region of the through hole and where the side surface portion of the honeycomb structure is not covered; hole making means for forming, in the film attached to the end face of the honeycomb structure, holes opened so as to correspond to the openings of a part of the cells, thereby forming a mask; plugging material supply means for supplying a plugging material having fluidity onto the mask provided with the holes or onto the table portion; and filling means for filling the cells with the plugging material supplied onto the mask or the table portion.

According to the eighth aspect of the present invention, an apparatus for manufacturing a honeycomb structure having a plugged portion is provided, the apparatus comprising: a table portion having a through hole into which the end face portion of a honeycomb structure is to be inserted, the honeycomb structure having porous partition walls and provided with a plurality of cells partitioned by the partition walls and formed so as to extend through the honeycomb structure from one end of the honeycomb structure to the other end face thereof; positioning means for positioning and holding the table portion and the honeycomb structure so that the surface of the table portion has the same plane as that of the end face of the honeycomb structure in a state where the end face portion of the honeycomb structure is inserted into the through hole of the table portion; film attaching means for attaching a film to the surface of the table portion and the end face of the honeycomb structure after positioning the table portion and the honeycomb structure; hole making means for forming, in the film attached to the end face of the honeycomb structure, holes opened so as to correspond to the openings of a part of the cells, thereby forming a mask; plugging material supply means for supplying a plugging material having fluidity onto the mask provided with the holes or onto the table portion; and filling means for filling the cells with the plugging material supplied onto the mask or the table portion.

According to the ninth aspect of the present invention, the apparatus for manufacturing the honeycomb structure having a plugged portion according to any one of the sixth to eighth aspects is provided, further comprising: moving means for moving the table portion or the honeycomb structure after filling the cells with the plugging material; peeling means for peeling the mask; and drying means for drying the honeycomb structure.

According to the tenth aspect of the present invention, the apparatus for manufacturing the honeycomb structure having a plugged portion according to any one of the sixth to ninth aspects is provided, wherein the table portion has side wall portions which are arranged on opposite sides of the through hole on the surface of the table portion and which are formed so as to project from the surface of the table portion, whereby the plugging material is prevented from leaking from the surface of the table portion.

The table portion and the end face of the honeycomb structure are positioned to attach the film in a flat state to the table portion and the end face of the honeycomb structure, and the holes are made in this film, whereby the mask can be formed. Then, the plugging material is supplied onto the mask or the table portion to fill the cells with the plugging material, whereby the cells can be plugged. Unlike a conventional method for immersing the end face of the honeycomb structure into the leveled plugging material, the plugging material is supplied onto the mask or the table portion to plug the cells, whereby manufacturing time can be shortened, and manufacturing cost can be decreased. That is, in a conventional press-in process, a filling material needs to be leveled, but in the method of manufacturing the present invention, the leveling does not have to be performed, and the method is very simple.

Furthermore, the conventional attaching step wherein a film is bent so as to make the film attached to the end face of the honeycomb structure is hardly applicable to an article having a curved surface and a cylindrical surface, and it is difficult to mechanically perform the step. Therefore, if the step is manually performed, very much time is required. On the other hand, when the film is flatly attached as in the present invention, it is very easy to mechanically attach the film.

Moreover, similarly, to peel the film, when the film is bent and attached to the only honeycomb structure as in the conventional method, the honeycomb structure has to be carefully treated, and much time is required. However, when the film is attached to the table portion as in the present invention, the peeling can be easily performed with a peeling machine, and the film can be peeled in short time.

Furthermore, effects will specifically be described. According to the first aspect of the present invention, the plugging material having the fluidity is supplied onto the mask or the same plane as the mask, and then the cells of the honeycomb structure can be filled with the plugging material. The film is held in the flat state so as to cover the table portion and the honeycomb structure, so that any stepped portion is not generated, and consequently that the cells can smoothly be plugged, and a uniform plugging depth can easily be obtained.

According to the second and sixth aspects of the present invention, the film can securely be attached to the honeycomb structure, and the dislocation of the film mask in the filling step can be decreased.

According to the third and seventh aspects of the present invention, the film can be attached to a flat surface, and the film is first attached to the table portion, whereby the film can easily be attached with a roller or the like without generating any wrinkle. That is, a problem that the wrinkle is generated in the attached film can be avoided. Moreover, the handling of the remaining film portion is eliminated, and it does not have to be feared that the film might be attached to the side surface of a work (the honeycomb structure), the apparatus or the like during transport. In consequence, the structure of the apparatus can be simplified.

According to the fourth and eighth aspects of the present invention, the honeycomb structure and the table portion are positioned before attaching the film. Therefore, the honeycomb structure and the table portion can accurately be positioned. If the honeycomb structure is positioned lower than the table portion, a pressure fluctuates, and thereby the plugging depth becomes non-uniform. When the honeycomb structure is positioned higher than the table portion, there is a possibility that the honeycomb structure is broken during the filling step.

According to the fifth aspect of the present invention, the holes can precisely be made at a high speed by use of laser (not needles or the like). Moreover, stage relocation is not required, which is advantageous from a viewpoint of manufacturing steps. Furthermore, there are effects that a thin mask is inexpensively realized and that a plugging material wasted as much as the thickness of the mask is decreased.

According to the ninth aspect of the present invention, the mask (the film) can easily be peeled, and the constitution of the apparatus is simplified. The structure may be dried after or before peeling the mask. When the structure is dried and then the mask is peeled, the structure becomes resistant against surface sink owing to the thickness of the film.

According to the tenth aspect of the present invention, even in a case where the cells are filled with the plugging material while pressurizing the material, the leakage of the plugging material can be prevented, and the use efficiency of the plugging material can be increased. Even in a case where the cells are filled with the plugging material while pressurizing the material, any pressure does not laterally escape, and a uniform pressure can be applied for filling. The plugging with less fluctuation can be realized.

DETAILED DESCRIPTION OF THE INVENTION

Figure 1:
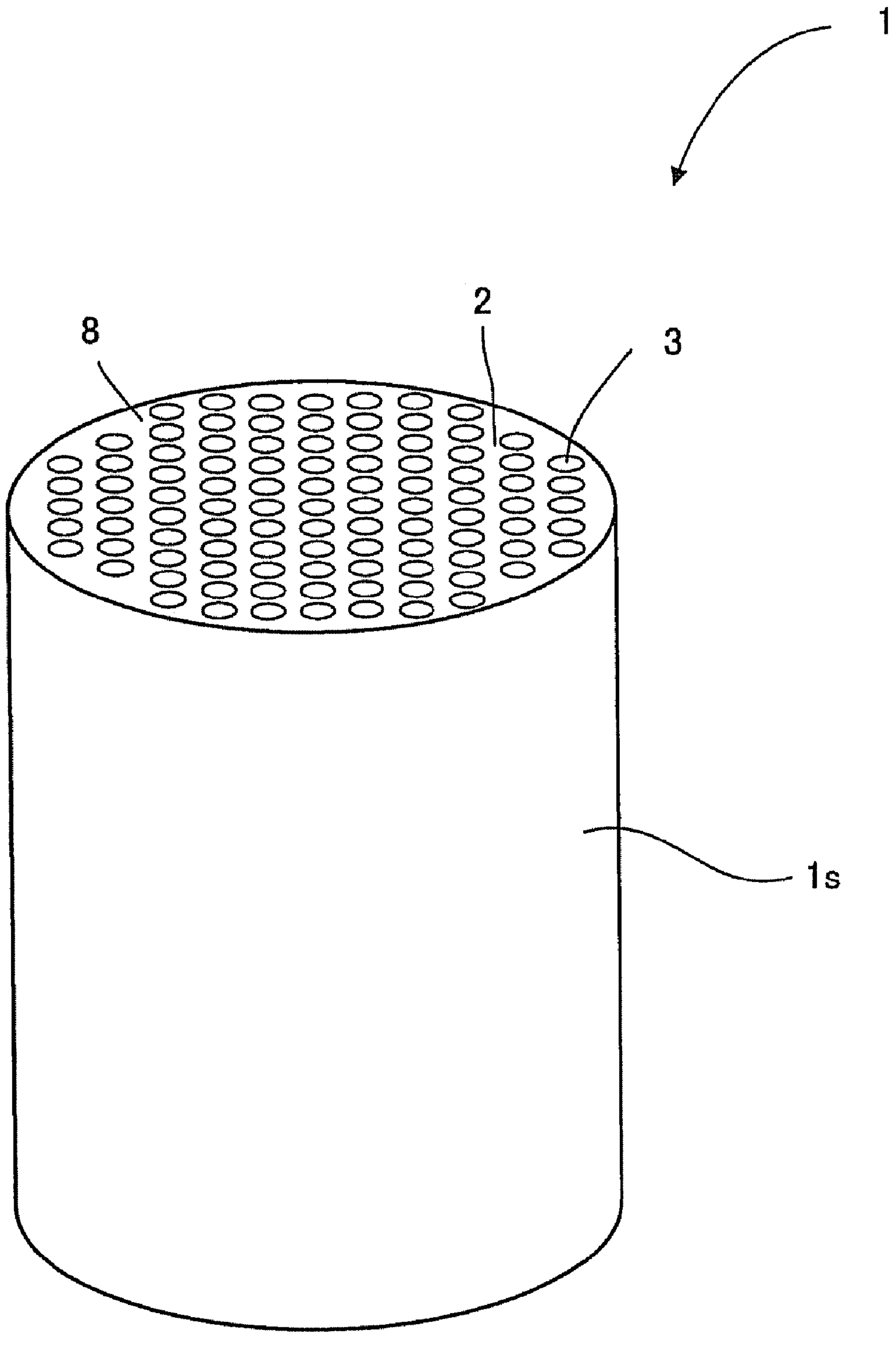
FIG. 1 shows one embodiment of a honeycomb structure to be plugged.

Embodiments of the present invention will hereinafter be described with reference to the drawings. However, the present invention is not limited to the following embodiments, and can be altered, modified or improved without departing from the scope of the present invention. Like features have been designated with the reference numerals and repeat descriptions thereof have been omitted.

As shown in, for example, FIG. 1, a honeycomb structure 1 to be plugged has porous partition walls 2, and a plurality of cells 3 are partitioned by the partition walls 2 and formed so as to extend through the structure from one end face 8 of the structure to the other end face 8 thereof. The structure is formed of a ceramic material. More specifically, the honeycomb structure contains a ceramic material selected from the group consisting of cordierite, mullite, alumina, silicon carbide and a combination of them from viewpoints of strength, thermal resistance and the like.

Then, a plastic clay is prepared by adding a binder, an organic pore former, a surfactant, water and the like to the above raw material, and the clay is subjected to, for example, extrusion forming, to form the columnar honeycomb structure 1 having a large number of cells 3 which are partitioned by the partition walls 2 and which extend through the structure in an axial direction.

Figure 2:
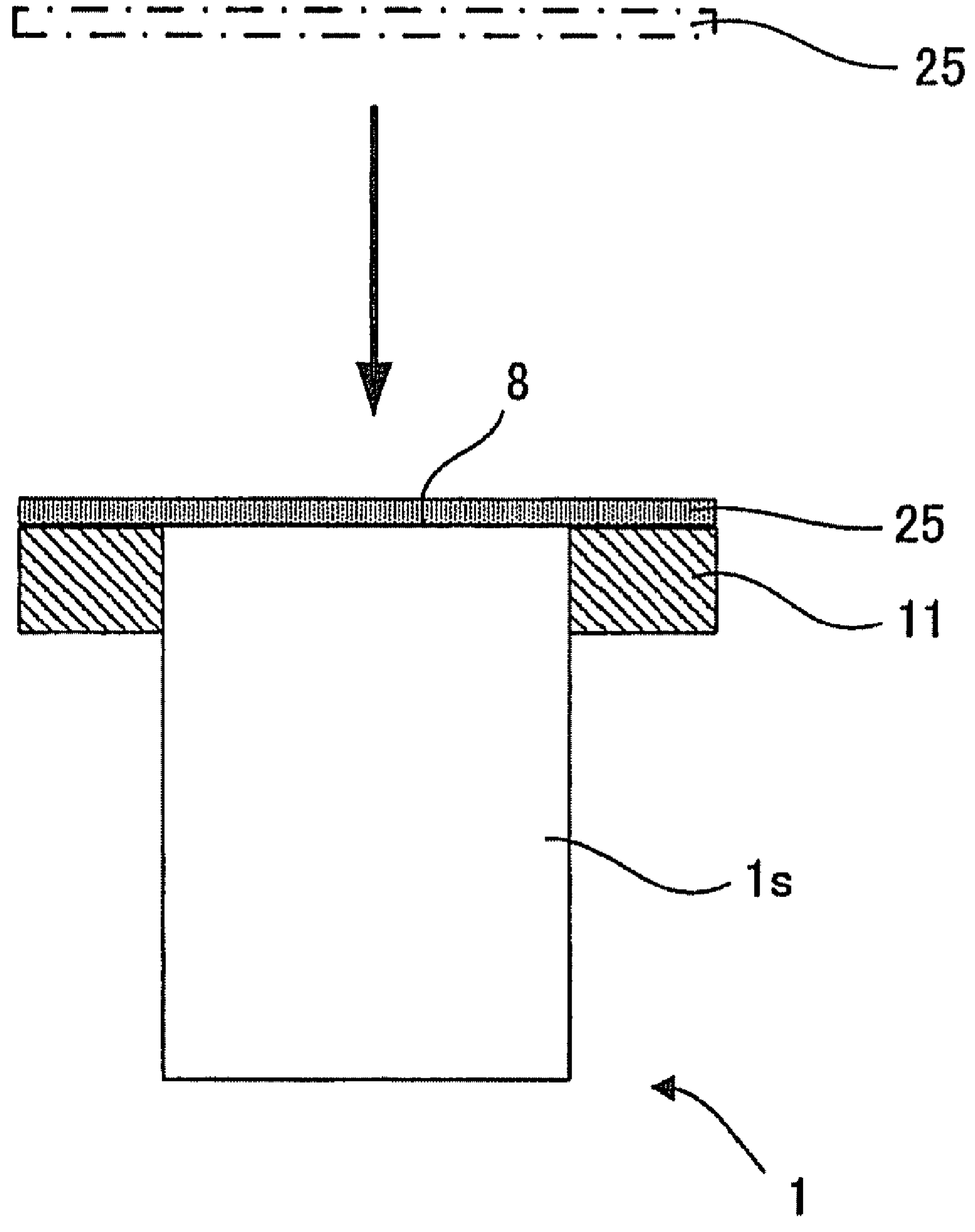
FIG. 2 is a diagram schematically showing the attaching of a film.

The outline of a method for plugging the honeycomb structure 1 of the present invention will be described with reference to FIG. 2. To plug the cells 3 of the honeycomb structure 1, in a state where the honeycomb structure 1 is positioned in a table portion 11 (see FIG. 3A) having a through hole 11*h* into which the end face portion of the honeycomb structure 1 is to be inserted as shown in FIG. 2, a film 25 is attached to the end face 8 so that a side surface portion is of the honeycomb structure 1 is not covered. Moreover, in a state where a remaining portion of the film 25 which is not attached to the end face 8 is attached to the table portion 11, the film 25 is held in a flat state. Then, holes opened so as to correspond to the openings of a part of the cells 3 are formed in the film 25 to form the film 25 as a mask, and a plugging material 31 (a slurry) having fluidity is supplied onto the mask or the same plane as the mask. Afterward, the cells 3 of the honeycomb structure 1 are filled with the plugging material 31.

Heretofore, the plugging material 31 has been put into a container, and leveled, and the honeycomb structure 1 has been immersed into the material to plug the cells. However, the cells are plugged as described above, whereby time required for plugging the cells can be shortened, and manufacturing cost can be decreased.

Figure 3A:
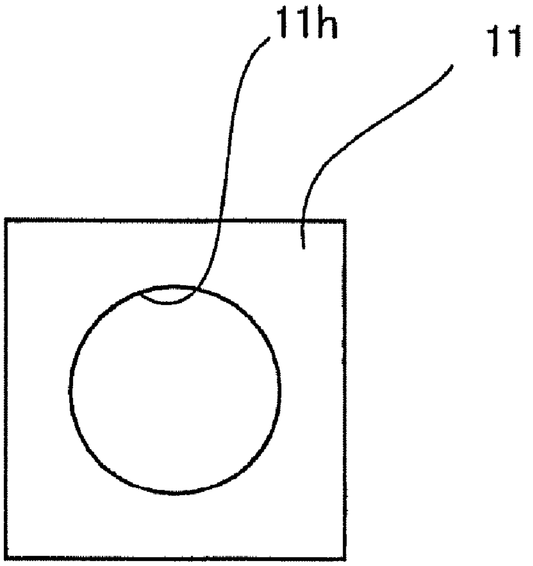
FIG. 3A is a diagram showing a through hole in a table portion.
Figure 3B:
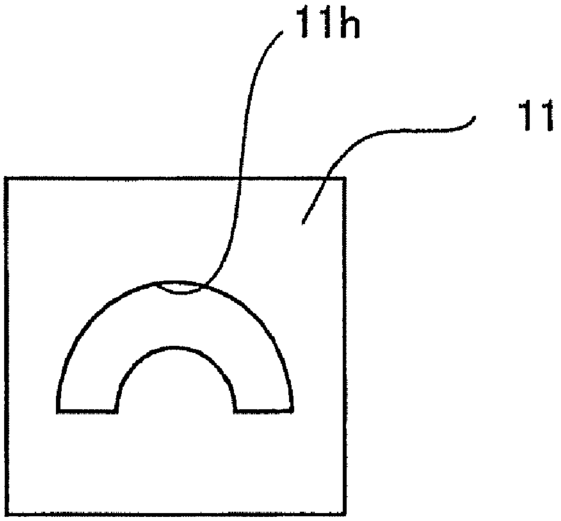
FIG. 3B is a diagram showing the other embodiment of a through hole in a table portion.
Figure 13:
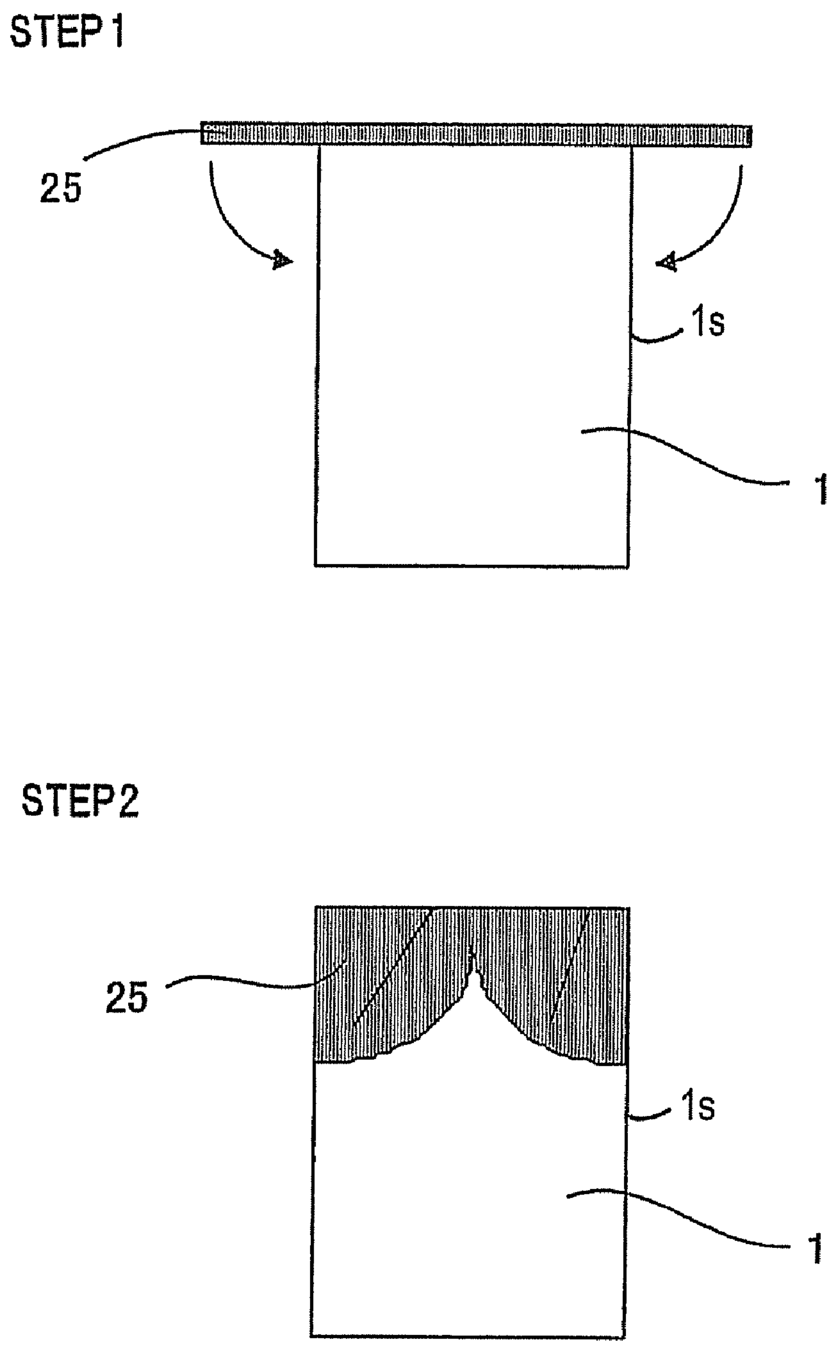
FIG. 13 Prior Art
FIG. 13 is a diagram showing the attaching of a film according to a conventional technology.

FIGS. 3A and 3B show plan views of the table portion 11. As described above, when the table portion 11 and the honeycomb structure 1 are covered with the same film 25, not only the columnar honeycomb structure 1 having a shape adapted for that of the through hole 11*h* as shown in FIG. 3A but also the honeycomb structure 1 having a shape adapted for that of the through hole 11*h* as shown in FIG. 3B can be masked without any problem. Steps 1 and 2 shown in FIG. 13 show a conventional method for attaching the film. Heretofore, a film 25 has been attached to an end face 8 of a honeycomb structure 1, and the film has been bent and attached to a side surface portion 1*s*. In this case, the attached film 25 is easily wrinkled, and especially the honeycomb structure 1 adapted for the shape of the through hole 11*h* shown in FIG. 3B is easily wrinkled. Moreover, when the film 25 is attached as shown in the steps 1 and 2 of FIG. 13, later in a hole forming step to form the film 25 as a mask, difficulty is generated in image processing for forming holes, and the plugging material 31 sometimes leaks owing to the influence of the generated wrinkle. However, when the table portion 11 and the honeycomb structure 1 are covered with the same film 25 in a flat state as shown in FIG. 2, the film 25 is not easily wrinkled, and the difficulty is not likely to be generated in the image processing of the hole forming step. That is, any problem during bending is eliminated, and the plugging material 31 might not be attached to the side surface of the honeycomb structure 1, owing to the film 25 being attached in a planar state as is disclosed in the present application. In consequence, an appearance quality level improves.

Embodiment 1

A specific plugging method will be described with reference to FIGS. 4 to 9. A manufacturing apparatus of a honeycomb structure 1 having a plugged portion, for use in a plugging method of the present invention, includes film attaching means for attaching a film 25 to an end face 8 of the honeycomb structure 1 in a state where a side surface portion is of the honeycomb structure 1 is not covered; a table portion 11 having a through hole 11*h* into which the honeycomb structure 1 is to be inserted; positioning means for moving the table portion 11 or the honeycomb structure 1 in a state where the honeycomb structure 1 to which the film 25 is attached is inserted into the through hole 11*h*, and positioning and holding the table portion 11 and the honeycomb structure 1 to attach the remaining portion of the film to the table portion 11 so that the film 25 attached to the end face 8 has a flat state; hole making means for forming, in the film 25, holes opened so as to correspond to the openings of a part of the cells 3; plugging material supply means for supplying a plugging material 31 having fluidity onto the mask provided with the holes or onto the table portion 11; and filling means for filling the cells 3 with the plugging material 31 supplied onto the mask or the table portion 11.

In more detail, the apparatus includes a roller 21 as the film attaching means, and the film 25 can be attached to the table portion 11 and the end face 8 of the honeycomb structure 1 by use of the roller 21. Moreover, as the positioning means for positioning the table portion 11 and the honeycomb structure 1, a motor 22 is connected to the table portion 11 to lift up and down the table portion 11. Alternatively, the motor 22 is connected to a support base 12 to lift up and down the support base 12 on which the honeycomb structure 1 is mounted. The apparatus includes laser 16 as the hole making means for making the holes in the film 25.

Figure 4:
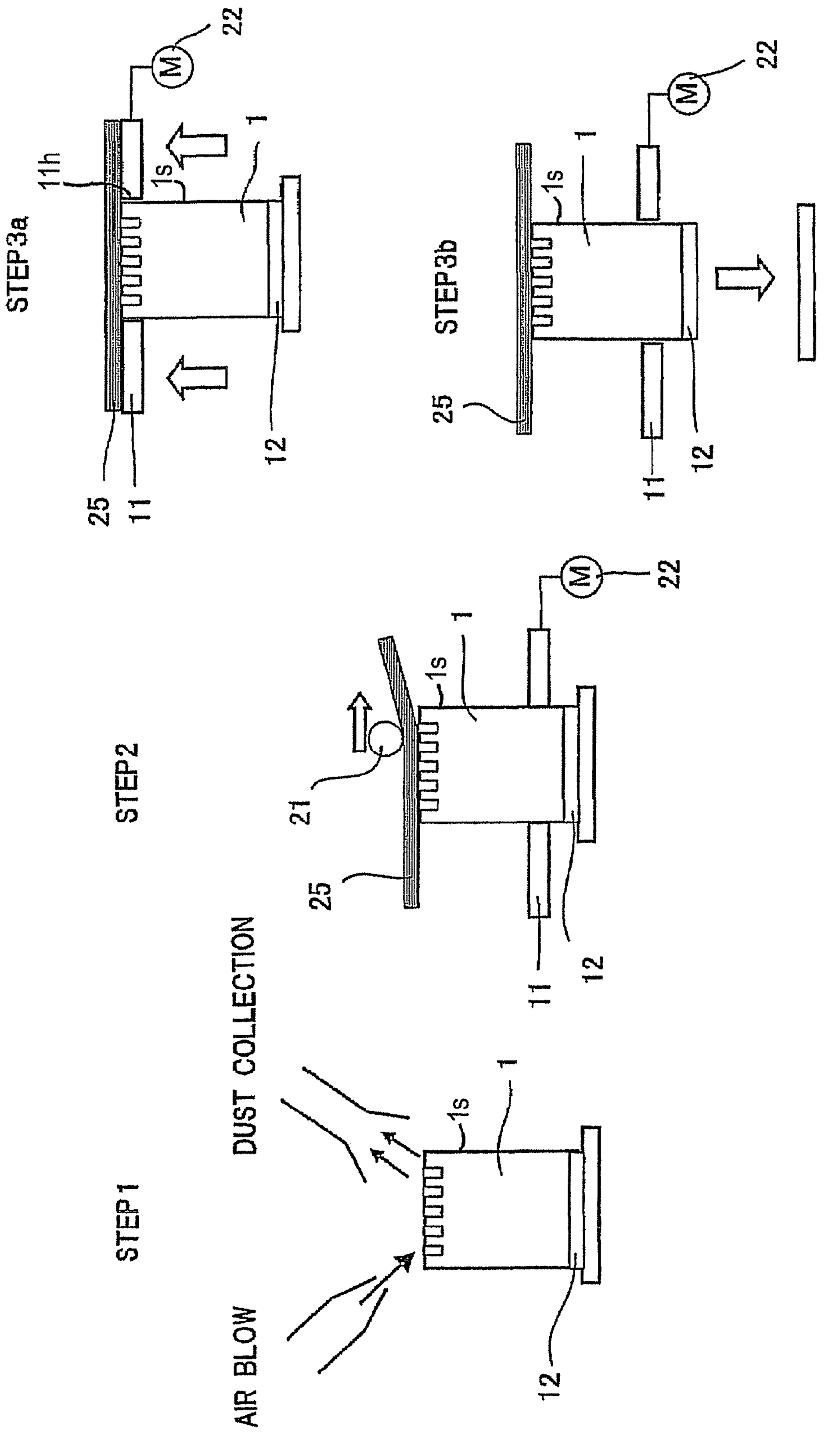
FIG. 4 is a diagram showing a plugging step according to Embodiment 1.

First, as shown in the step 1 of FIG. 4, dust attached to the end face 8 of the honeycomb structure 1 is removed by use of an air blow, the structure having the porous partition walls 2 and provided with a plurality of cells 3 partitioned by the partition walls 2 and formed so as to extend through the structure from one end face 8 to the other end face 8. The dust is collected to purify the end face 8.

Then, as shown in the step 2 of FIG. 4, the film 25 is attached to the end face 8 of the honeycomb structure 1 in a state where a part of the honeycomb structure 1 is inserted into the through hole 11*h* of the table portion 11 so that the side surface portion is of the honeycomb structure 1 is not covered. At this time, specifically, the film 25 is pressed with the roller 21 or the like, and brought into close contact with the end face 8. In this case, the film 25 can securely be attached to the honeycomb structure 1, and the displacement of the film 25 due to the movement of a pressurizing face in a filling step described later can be decreased. It is to be noted that the manufacturing apparatus of the honeycomb structure 1 having a plugged portion includes a cutting apparatus which cuts the film 25, and the film 25 cut into a predetermined size is attached.

Subsequently, as shown in the step 3*a* of FIG. 4, in a state where the honeycomb structure 1 provided with the film 25 is inserted into the through hole 11*h*, the motor 22 lifts up the table portion 11, and the table portion 11 and the honeycomb structure 1 are positioned and held to attach the remaining portion of the film 25 to the table portion 11 so that the film attached to the end face 8 has a flat state.

Alternatively, as shown in the step 3*b* of FIG. 4, the support base 12 on which the honeycomb structure 1 is mounted may be lowered and the film 25 attached to the end face 8 can be attached in a flat state to the table portion 11.

Subsequently, as shown in the step 4 of FIG. 5, the end face 8 of the honeycomb structure 1 is photographed with an image pickup apparatus 15 to acquire image data capable of specifying the shapes and positions of the cells 3 to be plugged and the cells 3 which are not to be plugged. There is not any special restriction on the image pickup apparatus 15 for photographing the end face 8 of the honeycomb structure 1. However, for example, a charge-coupled apparatus (CCD) camera, an X-ray computed tomography (CT) scanner or the like may preferably be used.

Subsequently, as shown in the step 5 of FIG. 5, based on the image data acquired in the previous step, the holes opened are formed in the film 25 by use of the laser 16 corresponding to the openings of a part of the cells 3, to form a mask. Therefore, the image pickup apparatus 15 and the laser 16 constitute the hole making means.

Figure 5:
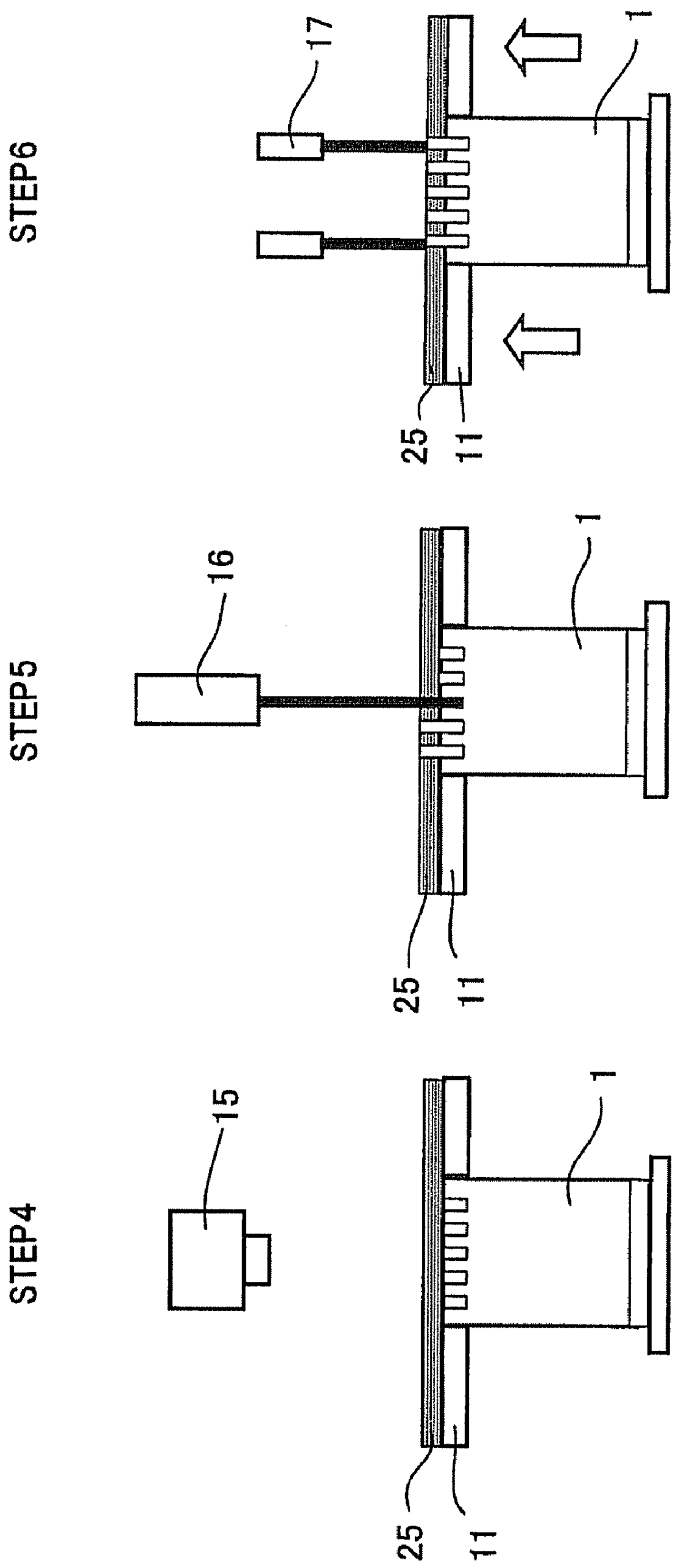
FIG. 5 is a diagram showing the plugging step according to Embodiment 1, subsequently to FIG. 4.

Then, as shown in the step 6 of FIG. 5, the honeycomb structure 1 is positioned in a predetermined position by use of a sensor 17 (e.g., an infrared sensor) so that the flat upper surface of the table portion 11 has the same plane as the end face 8 of the honeycomb structure 1.

Subsequently, as shown in the step 7 of FIG. 6, the plugging material 31 (a slurry) having fluidity is supplied onto the mask (the film 25) provided with the holes or onto the table portion 11 by use of a plugging material supply apparatus 23 as the plugging material supply means. Examples of the plugging material 31 for use in plugging the cells include a mixture obtained by mixing ceramic powder, a bonding agent and a deflocculant and water added as a dispersion medium thereto. It is to be noted that cordierite, mullite, alumina, silicon carbide or the like may be used as a ceramic material.

Figure 6:
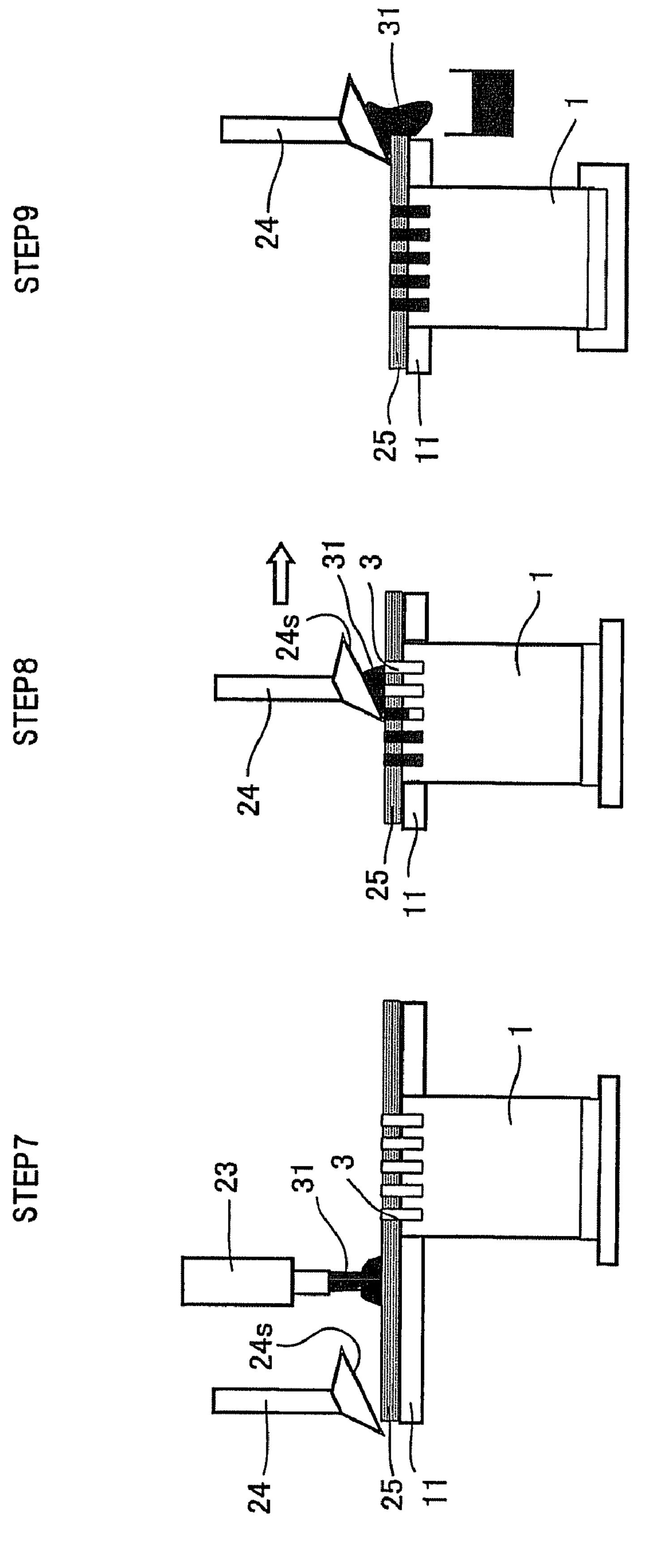
FIG. 6 is a diagram showing the plugging step according to Embodiment 1, subsequently to FIG. 5.

Then, as shown in the step 8 of FIG. 6, a plugging apparatus 24 as a pressurizing member fills the cells 3 with the plugging material 31 supplied onto the mask or the table portion 11. Specifically, the plugging apparatus 24 has a pressurizing face 24*s* which is arranged at an acute angle with respect to the surface of the mask to pressurize the plugging material 31, and moving means which moves along the table portion 11. After supplying the plugging material 31 onto the mask of the honeycomb structure 1 positioned with respect to the table portion 11 or onto the table portion 11, the plugging apparatus 24 moves along the table portion 11, whereby the plugging material 31 supplied onto the mask is pressurized by the pressurizing face 24*s* to fill the cells 3 of the honeycomb structure 1 with the plugging material 31.

The film 25 is attached in the flat state so as to cover the table portion 11 and the honeycomb structure 1, whereby a stepped portion on the surface of the film brought into continuous contact with the pressurizing face 24*s* can be eliminated. Therefore, the pressurizing face 24*s* can smoothly be moved to set a plugging depth to a uniform depth.

Figure 8:
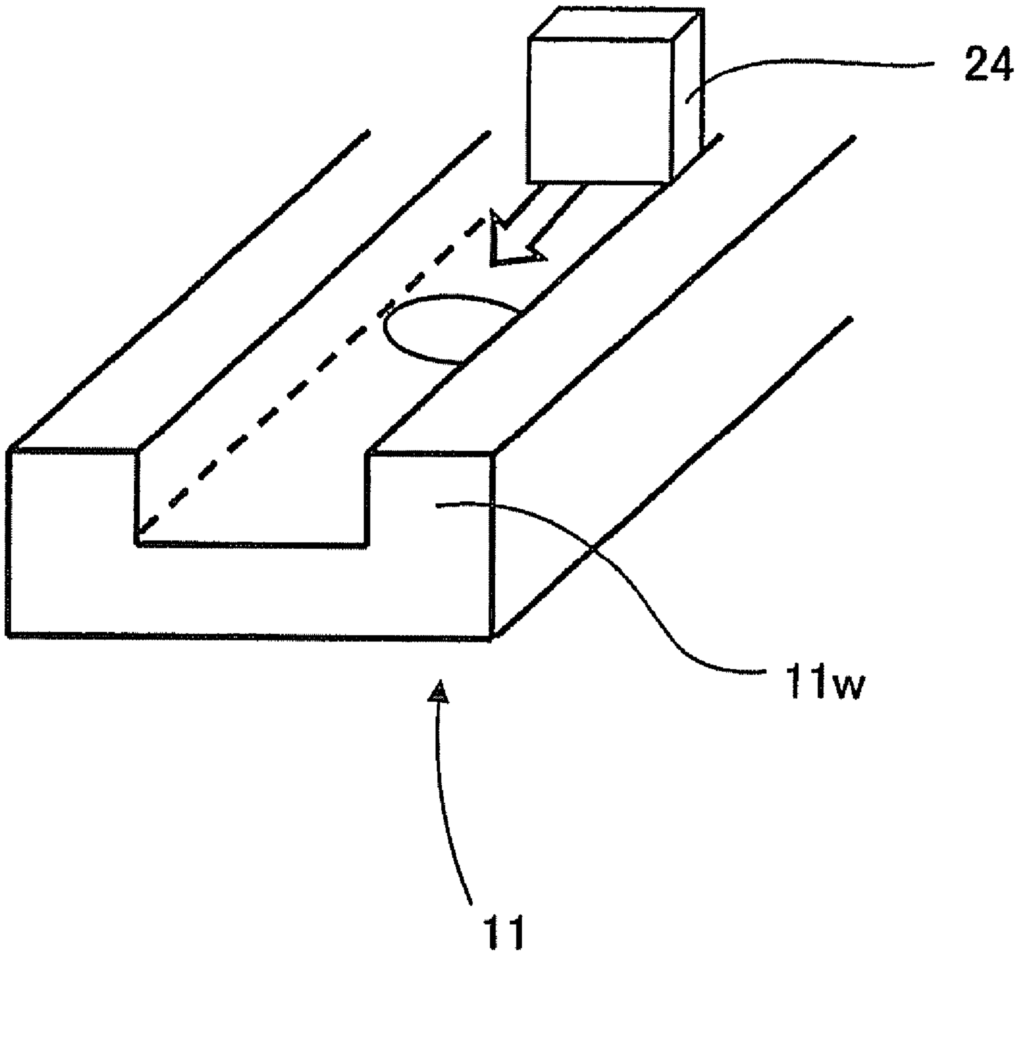
FIG. 8 is a diagram showing the side wall portion of the table portion.

As shown in FIG. 8, it may be constituted that the table portion 11 has side wall portions 11*w* protruding from the surface of the table portion and formed in parallel on opposite sides of the through hole on the surface of the table portion. In consequence, the plugging material 31 can be prevented from leaking from the surface of the table portion 11. Moreover, the leakage of the plugging material 31 from a pressurizing face side can be prevented, and the use efficiency of the plugging material 31 can be increased. Furthermore, any pressure does not escape laterally from the pressurizing face, and a uniform pressure can be applied to the material. Therefore, the plugging with less fluctuation can be performed.

Subsequently, after filling the cells 3 with the plugging material 31, as shown in the step 9 of FIG. 6, the plugging apparatus 24 is moved off the table portion 11 to remove the extra plugging material 31 from the table portion 11.

Figure 7:
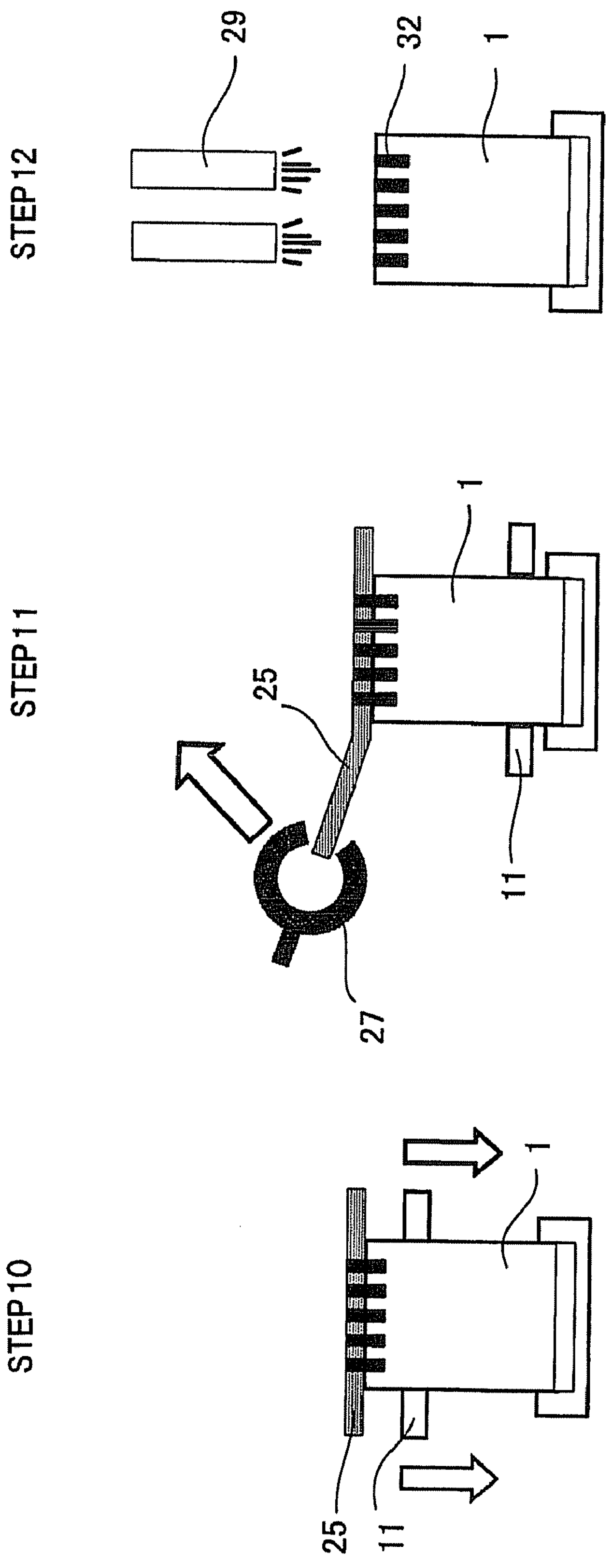
FIG. 7 is a diagram showing the plugging step according to Embodiment 1, subsequently to FIG. 6.
Figure 9:
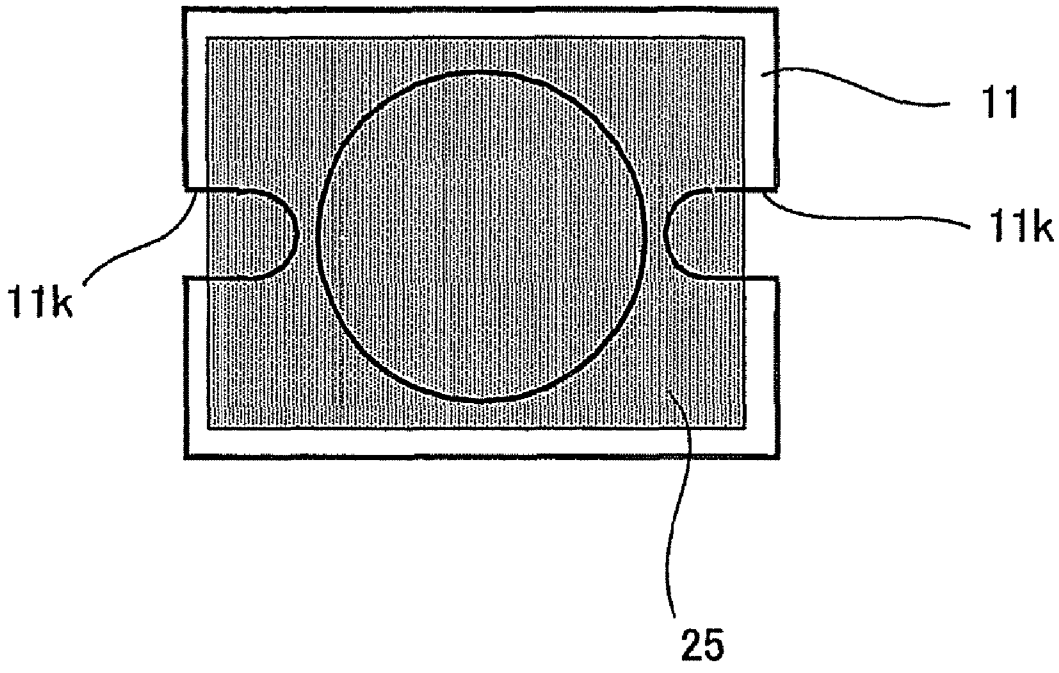
FIG. 9 is a diagram showing a notch portion in the table portion.

Subsequently, as shown in the step 10 of FIG. 7, the table portion 11 is lowered by the moving means to peel the film 25 from the table portion 11. Then, as shown in the step 11 of FIG. 7, the mask attached to the end face 8 is peeled by a peeling apparatus 27. As shown in FIG. 9, when cutout portions 11*k* are formed in both ends of the table portion 11, the film can be peeled without lowering the table portion 11. As shown in the step 12 of FIG. 7, the honeycomb structure 1 is dried by a drying apparatus 29 as the drying means, whereby the honeycomb structure 1 having a plugged portion provided with plugging portions 32 is completed.

Embodiment 2

Another plugging method will be described with reference to FIG. 10. A manufacturing apparatus of a honeycomb structure 1 having a plugged portion according to Embodiment 2 for use in the plugging method of the present invention includes a table portion 11 having a through hole 11*h* into which the end face portion of the honeycomb structure 1 is to be inserted; film attaching means for attaching a film 25 to the side of the surface of the table portion 11; positioning means for positioning and holding the table portion 11 and the honeycomb structure 1 so as to attach the film 25 to the end face 8 of the honeycomb structure in a state where the end face portion of the honeycomb structure 1 is inserted into the through hole 11*h* of the table portion 11 provided with the film 25 attached to the side of the surface of the table portion including a region of the through hole 11*h* and where a side surface portion is of the honeycomb structure 1 is not covered; hole making means for forming, in the film 25 attached to the end face 8 of the honeycomb structure 1, holes opened so as to correspond to the openings of a part of the cells 3, thereby forming a mask; plugging material supply means for supplying a plugging material 31 having fluidity onto the mask provided with the holes or onto the table portion 11; and filling means for filling the cells 3 with the plugging material 31 supplied onto the mask or the table portion 11.

Figure 10:
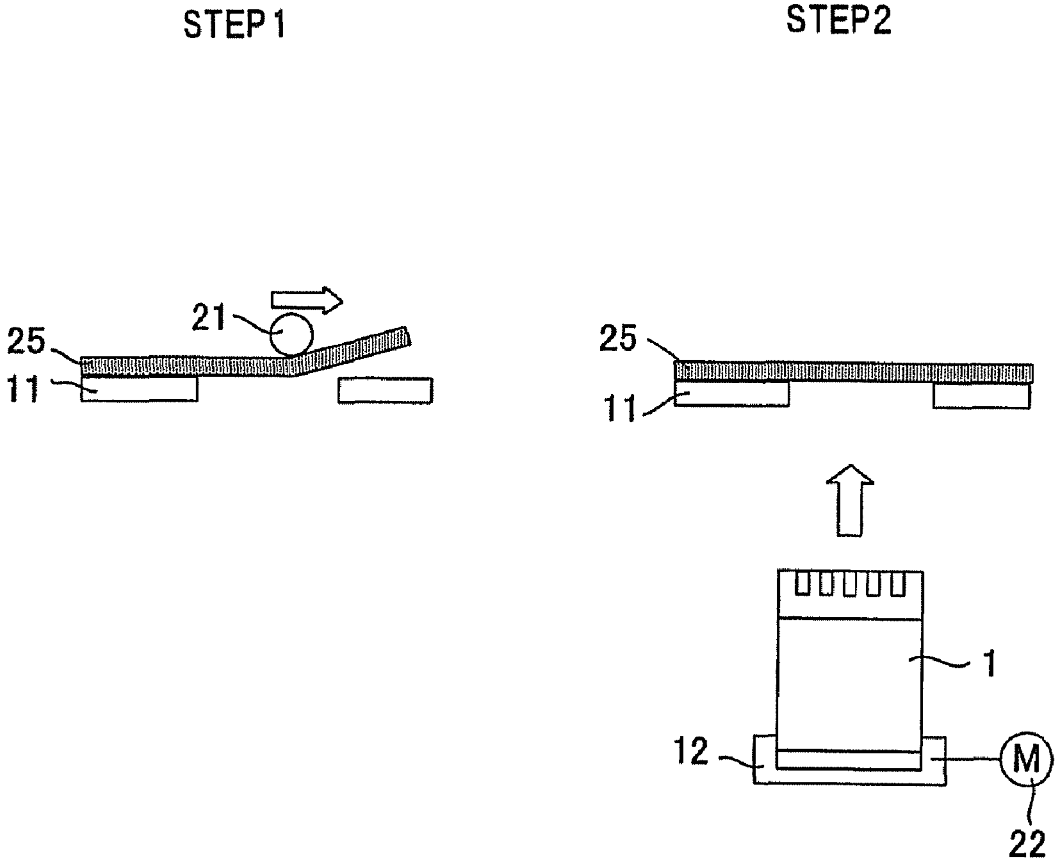
FIG. 10 is a diagram showing a plugging step according to Embodiment 2.

As shown in the step 1 of FIG. 10, the film 25 is attached to the upside of the table portion 11 by the film attaching means. At this time, specifically, the film 25 may be pressed with a roller 21 or the like, and brought into close contact with the surface of the table portion 11. It is to be noted that the manufacturing apparatus of the honeycomb structure 1 having a plugged portion includes a cutting apparatus which cuts the film 25 to attach the film 25 cut into a predetermined size.

After attaching the film 25 to the region of the surface of the table portion 11 including the through hole 11*h*, as shown in the step 2 of FIG. 10, a support base 12 is lifted by a motor 22, whereby the end face portion of the honeycomb structure 1 is inserted into the through hole 11*h*, and the film 25 is attached to the end face 8 of the honeycomb structure 1. That is, in a state where the honeycomb structure 1 is inserted into the through hole 11*h* of the table portion 11 to which the film 25 is attached, the honeycomb structure 1 is positioned and held with respect to the table portion 11 by the motor 22 as the positioning means so as to attach the remaining portion of the film to the honeycomb structure 1 so that the film 25 attached to the end face 8 has a flat state.

Then, in the same manner as in Embodiment 1, the end face 8 of the honeycomb structure 1 is photographed to acquire image data, and the holes are formed in the film 25 by laser 16, to form a mask.

Subsequently, the plugging material 31 is supplied by a plugging material supply apparatus 23 to fill the cells 3 with the plugging material 31 by a plugging apparatus 24. That is, the plugging apparatus 24 moves along the table portion 11, whereby the plugging material 31 supplied onto the mask is pressurized by a pressurizing face 24*s* to fill the cells 3 of the honeycomb structure 1 with the plugging material 31. Then, the slurry of the plugging material 31 is removed from the table portion 11.

Then, the table portion 11 is lowered to peel the film 25 from the table portion 11. The honeycomb structure 1 which has been plugged is dried to complete the honeycomb structure having a plugged portion.

Embodiment 3

A plugging method according to Embodiment 3 will be described with reference to FIG. 11. In the method of Embodiment 3, a film 25 is first attached to the surface of a table portion 11 in the same manner as in Embodiment 2, but a manufacturing line includes a plurality of table portions 11 arranged in a horizontal direction and a band-like film 25 disposed on the side of the surfaces of the table portions 11.

Specifically, a manufacturing apparatus of a honeycomb structure 1 having a plugged portion according to Embodiment 3 for use in a plugging method according to the present invention includes a table portion 11 having a through hole 11*h* into which the end face portion of the honeycomb structure 1 is to be inserted; film attaching means for attaching the film 25 to the side of the surface of the table portion 11; positioning means for positioning and holding the table portion 11 and the honeycomb structure 1 so as to attach the film 25 to an end face 8 of the honeycomb structure in a state where the end face portion of the honeycomb structure 1 is inserted into the through hole 11*h* of the table portion 11 provided with the film 25 attached to the side of the surface of the table portion including a region of the through hole 11*h* and where a side surface portion is of the honeycomb structure 1 is not covered; hole making means for forming holes opened in the film 25 attached to the end face 8 of the honeycomb structure 1, so as to correspond to the openings of a part of the cells 3, thereby forming a mask; plugging material supply means for supplying a plugging material 31 having fluidity onto the mask provided with the holes or onto the table portion 11; and filling means for filling the cells 3 with the plugging material 31 supplied onto the mask or the table portion 11. Furthermore, the apparatus includes an unwinding portion 35 which unwinds the film 25 and a windup portion 36 which winds up the film.

Figure 11:
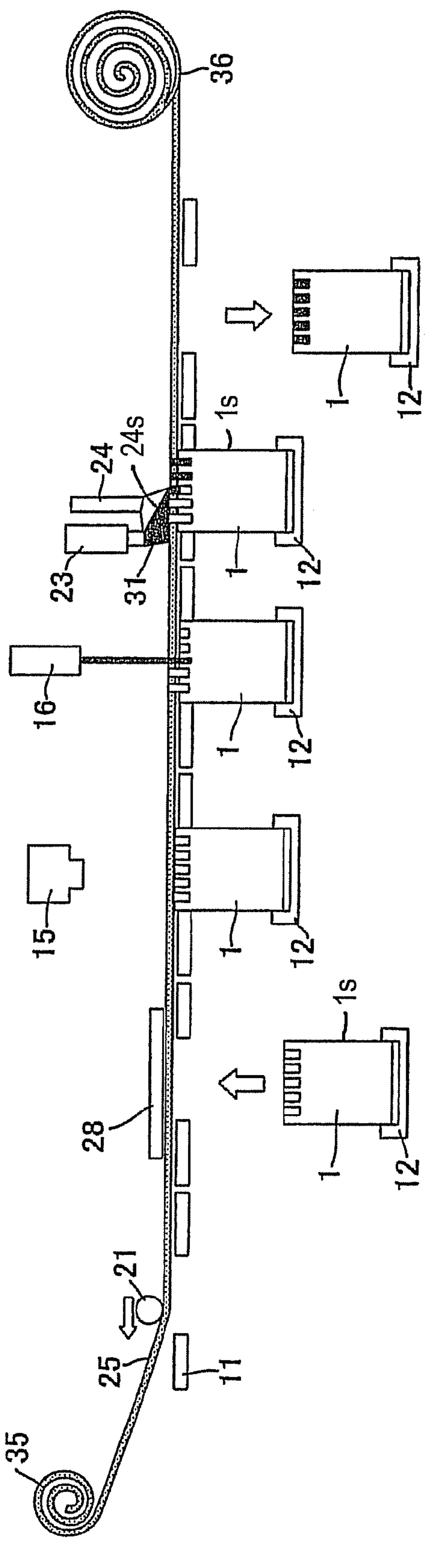
FIG. 11 is a diagram showing a plugging step according to Embodiment 3.

The table portion 11 and the film 25 integrally and intermittently move along the manufacturing line in predetermined time (they move from the left to the right in FIG. 11). First, on the left end of FIG. 11, a roller 21 as the film attaching means presses the film 25 to attach the film 25 to the upside of the table portion 11.

After attaching the film 25 to the region of the surface of the table portion 11 including the through hole 11*h*, the end face portion of the honeycomb structure 1 is inserted into the through hole 11*h*, and the film 25 is attached to the end face 8 of the honeycomb structure 1. At this time, a plate-like member 28 suppresses the deformation of the film 25 from the upside of the film 25 to bring the film into close contact with the end face 8. That is, the positioning means positions and holds the honeycomb structure 1 with respect to the table portion 11 so as to attach the remaining portion of the film to the honeycomb structure 1 so that the film 25 attached to the end face 8 has a flat state in a state where the honeycomb structure 1 is inserted into the through hole 11*h* of the table portion 11 to which the film 25 is attached.

Then, after the honeycomb structure 1 moves to a position under an image pickup apparatus 15, the end face 8 of the honeycomb structure 1 is photographed by the image pickup apparatus 15 to acquire image data capable of specifying the shapes and positions of the cells 3 to be plugged and the cells 3 which are not to be plugged. Subsequently, based on the image data acquired in the previous step, the holes opened so as to correspond to the openings of a part of the cells 3 are formed in the film 25 by use of laser 16, to form a mask. Therefore, the image pickup apparatus 15 and the laser 16 constitute the hole making means. It is to be noted that the position of the image pickup apparatus 15 for photographing the image may be adjusted finely (as much as the major diameter of the honeycomb structure 1) in accordance with the position of the honeycomb structure 1, and the position of the laser 16 for making the holes may similarly finely be adjusted.

Subsequently, the plugging material 31 having the fluidity is supplied onto the mask provided with the holes or onto the table portion 11 by use of a plugging material supply apparatus 23, and the cells 3 are filled with the plugging material 31 supplied onto the mask or the table portion 11 by use of a plugging apparatus 24. That is, the plugging apparatus 24 moves along the table portion 11, whereby the plugging material 31 supplied onto the mask is pressurized by a pressurizing face 24*s* to fill the cells 3 of the honeycomb structure 1 with the plugging material 31.

Subsequently, the table portion 11 is lowered to peel the film 25 from the table portion 11, and the film 25 is wound up and collected. Afterward, the honeycomb structure 1 which has been plugged is dried to complete the honeycomb structure 1 having a plugged portion.

It is to be noted that in Embodiments 1, 2, the plugging apparatus 24 moves, but in Embodiment 3, the plugging apparatus 24 is immobile, and the honeycomb structure 1 side moves, whereby the plugging apparatus 24 relatively moves. In this case, the mechanism of the plugging apparatus 24 is simplified.

Embodiment 4

Figure 12:
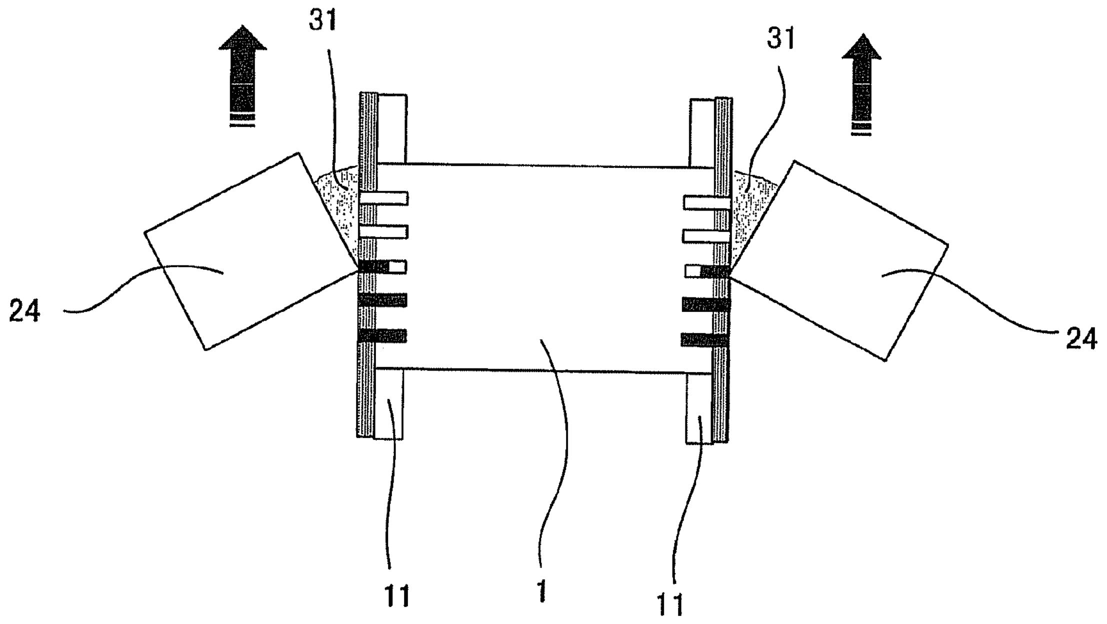
FIG. 12 is a diagram showing Embodiment 4 in which both end faces of a honeycomb structure are simultaneously plugged.

FIG. 12 shows Embodiment 4 in which both end faces 8 of a honeycomb structure 1 are simultaneously plugged. As shown in FIG. 12, the honeycomb structure 1 is horizontally laid so that the axial direction (the height direction) of the honeycomb structure 1 is substantially horizontal, and a plugging material 31 having fluidity is supplied onto masks or table portions 11, whereby plugging apparatuses 24 are upwardly moved from below to fill cells 3 with the plugging material 31. According to such a constitution, both the end faces 8 can simultaneously be plugged, and required time for the plugging can be decreased by half.

The manufacturing method of a honeycomb structure and the manufacturing apparatus thereof according to the present invention are preferably utilized as means for preparing a honeycomb structure having a plugged portion for use as a carrier for a catalyst apparatus or a filter such as a DPF.

What is claimed:

1. A manufacturing apparatus of a honeycomb structure having a plugged portion, comprising:

film attaching means for attaching a film to the end face of the honeycomb structure in a state where the side surface portion of the honeycomb structure is not covered, the honeycomb structure having porous partition walls and provided with a plurality of cells partitioned by the partition walls and formed so as to extend through the honeycomb structure from one end face of the honeycomb structure to the other end face thereof;

a table portion having a through hole into which the honeycomb structure is to be inserted;

positioning means for moving the table portion or the honeycomb structure in a state where the honeycomb structure to which the film is attached is inserted into the through hole, and positioning and holding the table portion and the honeycomb structure to attach the remaining portion of the film to the table portion so that the film attached to the end face has a flat state;

hole making means for forming, in the film, holes opened so as to correspond to the openings of a part of the cells;

plugging material supply means for supplying a plugging material having fluidity onto the mask provided with the holes or onto the table portion; and filling means for filling the cells with the plugging material supplied onto the mask or the table portion.

2. A manufacturing apparatus of a honeycomb structure having a plugged portion, comprising:

a table portion having a through hole into which the end face portion of a honeycomb structure is to be inserted, the honeycomb structure having porous partition walls and provided with a plurality of cells partitioned by the partition walls and formed so as to extend through the honeycomb structure from one end of the honeycomb structure to the other end face thereof;

film attaching means for attaching a film to the side of the surface of the table portion;

positioning means for positioning and holding the table portion and the honeycomb structure so as to attach the film to the end face of the honeycomb structure in a state where the end face portion of the honeycomb structure is inserted into the through hole of the table portion provided with the film attached to the side of the surface of the table portion including a region of the through hole and where the side surface portion of the honeycomb structure is not covered;

hole making means for forming, in the film attached to the end face of the honeycomb structure, holes opened so as to correspond to the openings of a part of the cells, thereby forming a mask;

plugging material supply means for supplying a plugging material having fluidity onto the mask provided with the holes or onto the table portion; and filling means for filling the cells with the plugging material supplied onto the mask or the table portion.

3. A manufacturing apparatus of a honeycomb structure having a plugged portion, comprising:

a table portion having a through hole into which the end face portion of a honeycomb structure is to be inserted, the honeycomb structure having porous partition walls and provided with a plurality of cells partitioned by the partition walls and formed so as to extend through the honeycomb structure from one end of the honeycomb structure to the other end face thereof;

positioning means for positioning and holding the table portion and the honeycomb structure so that the surface of the table portion has the same plane as that of the end face of the honeycomb structure in a state where the end face portion of the honeycomb structure is inserted into the through hole of the table portion;

film attaching means for attaching a film to the surface of the table portion and the end face of the honeycomb structure after positioning the table portion and the honeycomb structure;

hole making means for forming, in the film attached to the end face of the honeycomb structure, holes opened so as to correspond to the openings of a part of the cells, thereby forming a mask;

plugging material supply means for supplying a plugging material having fluidity onto the mask provided with the holes or onto the table portion; and filling means for filling the cells with the plugging material supplied onto the mask or the table portion.

4. The manufacturing apparatus of the honeycomb structure having a plugged portion according to claim 1, further comprising:

moving means for moving the table portion or the honeycomb structure after filling the cells with the plugging material;

peeling means for peeling the mask; and drying means for drying the honeycomb structure.

5. The manufacturing apparatus of the honeycomb structure having a plugged portion according to claim 2, further comprising:

moving means for moving the table portion or the honeycomb structure after filling the cells with the plugging material;

peeling means for peeling the mask; and drying means for drying the honeycomb structure.

6. The manufacturing apparatus of the honeycomb structure having a plugged portion according to claim 3, further comprising:

moving means for moving the table portion or the honeycomb structure after filling the cells with the plugging material;

peeling means for peeling the mask; and drying means for drying the honeycomb structure.

7. The manufacturing apparatus of the honeycomb structure having a plugged portion according to claim 1, wherein the table portion has side wall portions which are arranged on opposite sides of the through hole on the surface of the table portion and which are formed so as to project from the surface of the table portion, whereby the plugging material is prevented from leaking from the surface of the table portion.

8. The manufacturing apparatus of the honeycomb structure having a plugged portion according to claim 2, wherein the table portion has side wall portions which are arranged on opposite sides of the through hole on the surface of the table portion and which are formed so as to project from the surface of the table portion, whereby the plugging material is prevented from leaking from the surface of the table portion.

9. The manufacturing apparatus of the honeycomb structure having a plugged portion according to claim 3, wherein the table portion has side wall portions which are arranged on opposite sides of the through hole on the surface of the table portion and which are formed so as to project from the surface of the table portion, whereby the plugging material is prevented from leaking from the surface of the table portion.

10. The manufacturing apparatus of the honeycomb structure having a plugged portion according to claim 4, wherein the table portion has side wall portions which are arranged on opposite sides of the through hole on the surface of the table portion and which are formed so as to project from the surface of the table portion, whereby the plugging material is prevented from leaking from the surface of the table portion.

11. The manufacturing apparatus of the honeycomb structure having a plugged portion according to claim 5, wherein the table portion has side wall portions which are arranged on opposite sides of the through hole on the surface of the table portion and which are formed so as to project from the surface of the table portion, whereby the plugging material is prevented from leaking from the surface of the table portion.

12. The manufacturing apparatus of the honeycomb structure having a plugged portion according to claim 6, wherein the table portion has side wall portions which are arranged on opposite sides of the through hole on the surface of the table portion and which are formed so as to project from the surface of the table portion, whereby the plugging material is prevented from leaking from the surface of the table portion.

* * * * *